United States Patent
Brueck et al.

(10) Patent No.: US 10,277,014 B2
(45) Date of Patent: Apr. 30, 2019

(54) PROFILED FRAME OF A FRAME STRUCTURE FOR AN ELECTRICAL ENCLOSURE OR A DISTRIBUTION CABINET

(71) Applicant: RITTAL GMBH & CO. KG, Herborn (DE)

(72) Inventors: Daniel Brueck, Giessen (DE); Heiko Holighaus, Eschenburg (DE); Hartmut Paul, Breitscheid (DE); Wolfgang Reuter, Liebenscheid (DE); Timo Schindler, Bischoffen (DE)

(73) Assignee: Rittal GmbH & Co. KG (DE)

( * ) Notice: Subject to any disclaimer, the term of this patent is extended or adjusted under 35 U.S.C. 154(b) by 0 days.

(21) Appl. No.: 15/116,779

(22) PCT Filed: Jan. 28, 2015

(86) PCT No.: PCT/DE2015/100034
§ 371 (c)(1),
(2) Date: Aug. 4, 2016

(87) PCT Pub. No.: WO2015/117597
PCT Pub. Date: Aug. 13, 2015

(65) Prior Publication Data
US 2016/0352080 A1    Dec. 1, 2016

(30) Foreign Application Priority Data
Feb. 5, 2014   (DE) .................. 10 2014 101 404

(51) Int. Cl.
*H02B 1/01* (2006.01)
*A47B 47/00* (2006.01)
*H02B 1/015* (2006.01)

(52) U.S. Cl.
CPC ......... *H02B 1/013* (2013.01); *A47B 47/0041* (2013.01); *A47B 47/0075* (2013.01); *H02B 1/015* (2013.01)

(58) Field of Classification Search
CPC ........................... H02B 1/013; A47B 47/0041
See application file for complete search history.

(56) References Cited

U.S. PATENT DOCUMENTS 3,044,656 A * 7/1962 Dobbie ................. B65D 88/12
217/69
3,087,768 A * 4/1963 MacK ............... A47B 47/0008
312/263
(Continued)

FOREIGN PATENT DOCUMENTS

CN        1320013 A    10/2001
CN      101790298 A     7/2010
(Continued)

OTHER PUBLICATIONS

International Search Report (in English and German) and Written Opinion (in German) for PCT/DE2015/100034, dated Apr. 10, 2015; ISA/EP.
(Continued)

*Primary Examiner* — Stanton L Krycinski
(74) *Attorney, Agent, or Firm* — Harness, Dickey & Pierce, PLC (57) ABSTRACT

The disclosure describes a frame profile of a rack for a switching or distribution cabinet, which forms a vertical and/or horizontal profile of the rack, consisting of a plurality of profile sections, which at least in part fit into each other, in order to form an open or closed hollow profile, with the additional features: at least one first profile section which has a plurality of attachment openings, wherein a first surface of the profile section determines an exterior assembly plane; by at least one second profile section a sealing (Continued)

plane for sealing of the inner area of the rack is defined; the outer assembly plane is displaced by the sealing plane to the inner area of the rack; and the attachment openings of the first profile section point away from the inner area of the rack.

8 Claims, 12 Drawing Sheets

(56) References Cited

U.S. PATENT DOCUMENTS

| | | | | |
|---|---|---|---|---|
| 3,353,854 | A * | 11/1967 | Hansen | E04B 1/5818 403/171 |
| 3,955,702 | A * | 5/1976 | Lundy | F21S 8/088 220/4.28 |
| 3,966,285 | A * | 6/1976 | Porch | B65D 7/24 220/4.28 |
| 4,643,319 | A * | 2/1987 | Debus | H02B 1/01 211/182 |
| 4,869,380 | A * | 9/1989 | Metcalfe | H05K 7/183 211/189 |
| 5,066,161 | A * | 11/1991 | Pinney | A47B 47/0008 403/172 |
| 5,202,818 | A * | 4/1993 | Betsch | H02B 1/301 211/189 |
| 5,655,662 | A * | 8/1997 | Garcia | B65D 7/24 206/453 |
| 5,930,972 | A * | 8/1999 | Benner | H02B 1/01 211/189 |
| 5,992,646 | A * | 11/1999 | Benner | H02B 1/01 211/26 |
| 5,997,117 | A * | 12/1999 | Krietzman | H02B 1/301 312/265.4 |
| 6,042,395 | A * | 3/2000 | Munch | H01R 4/64 439/92 |
| 6,062,664 | A * | 5/2000 | Benner | H02B 1/30 312/140 |
| 6,102,498 | A * | 8/2000 | Kohler | H02B 1/28 312/223.1 |
| 6,123,400 | A * | 9/2000 | Nicolai | H02B 1/301 211/189 |
| 6,149,255 | A * | 11/2000 | Benner | H02B 1/303 312/257.1 |
| 6,164,737 | A * | 12/2000 | Benner | H02B 1/01 312/223.1 |
| 6,205,738 | B1 * | 3/2001 | Chen | E04C 3/28 312/265.4 |
| 6,211,466 | B1 * | 4/2001 | Benner | H02B 1/306 174/66 |
| 6,231,142 | B1 * | 5/2001 | Pochet | H02B 1/16 211/189 |
| 6,238,027 | B1 * | 5/2001 | Kohler | E05D 5/023 312/265.1 |
| 6,273,533 | B1 * | 8/2001 | Nicolai | H02B 1/01 211/182 |
| 6,428,127 | B1 * | 8/2002 | Rasmussen | A47B 47/0008 312/265.4 |
| 6,965,075 | B2 * | 11/2005 | Suzuki | H02B 1/01 174/50 |
| 7,441,847 | B2 * | 10/2008 | Francisquini | H02B 1/01 312/265.3 |
| 8,128,183 | B2 * | 3/2012 | Shen | A47B 96/14 312/223.1 |
| 2001/0050516 | A1 * | 12/2001 | Minoura | H02B 1/308 312/223.1 |
| 2002/0121387 | A1 | 9/2002 | Suzuki et al. | |
| 2007/0175648 | A1 * | 8/2007 | Francisquini | H02B 1/01 174/50 |
| 2015/0377509 | A1 | 12/2015 | Nicolai et al. | |

FOREIGN PATENT DOCUMENTS

| | | |
|---|---|---|
| DE | 3300066 A1 | 7/1984 |
| DE | 19536950 C1 | 11/1996 |
| DE | 102005017312 A1 | 10/2006 |
| DE | 10207364 B4 | 6/2007 |
| DE | 102014101402 A1 | 8/2015 |
| EP | 2136446 A2 | 12/2009 |
| EP | 1587191 B1 | 8/2013 |
| JP | S56-04040 A | 4/1981 |
| JP | 2001-257481 A | 9/2001 |
| JP | 2002-319778 A | 10/2002 |
| JP | 2013-233044 A | 11/2013 |
| RU | 2166900 C2 | 5/2001 |
| RU | 2277369 C2 | 6/2006 |
| RU | 2384285 C2 | 3/2010 |

OTHER PUBLICATIONS

International Preliminary Report on Patentability (Chapter II) (in German) for PCT/DE2015/100034, dated Apr. 25, 2016; IPEA/EP.
Notice of Reasons for Refusal dated May 29, 2018 in related JP Application No. 2016-549056 with English translation.

* cited by examiner

PROFILED FRAME OF A FRAME STRUCTURE FOR AN ELECTRICAL ENCLOSURE OR A DISTRIBUTION CABINET

CROSS-REFERENCE TO RELATED APPLICATIONS

This application is a 371 U. S. National Stage of International Application No. PCT/DE2015/100034, filed on Jan. 28, 2015, which claims priority to German Application No. 10 2014 101 404.9, filed on Feb. 5, 2014. The entire disclosures of the above applications are incorporated herein by reference.

FIELD

The disclosure relates to a frame profile of a rack for a switching or distribution cabinet, which forms a vertical and/or horizontal profile of the rack, consisting of a plurality of profile sections, which at least in part fit into each other, in order to form an open or closed hollow profile.

BACKGROUND

This section provides background information related to the present disclosure which is not necessarily prior art.

Such frame profiles are known, for example, from DE 195 36 950 C1. There frame profiles are indicated for a rack of a switch cabinet, which are configured to be mirror-inverted to the cross sectional diagonal, and have two profile sides aligned perpendicular to the outer sides of the rack. These are provided with attachment openings and are connected with each other via a connection section. The overall result, for the open and closed profiles depicted, is four assembly planes, all of which are accessible from the inner area of the rack assembled from the frame profiles.

Installation of a panel into the inner space of a switch cabinet often requires considerable assembly expense. Thus with one switching cabinet structure described in EP 1 587 191 B1, with a rack of horizontal and vertical frame profiles in the floor area of the rack, guide rails are attached to the rack, on which the panel is placed and can be slid in the direction of the rear wall. If the underside of the panel, guided on the guide rails, has reached the end setting, then, from the slanted insertion setting, it is vertically aligned and attached with special holding elements in the upper area of the rack, preferably on the upper horizontal frame profiles. For insertion of the panel, the underside of the panel is equipped with guide elements, which also can be used for fixed placement of the panel on the guide rails. Along with the guide rails, the guiding elements and the holding elements is added an assembly task that is difficult to execute, since the set-up assembly elements make the holding elements difficult to access. For this, EP 1 587 191 B1 proposes to attach each of the lower holding elements on the side wall and/or on an adjoining floor wall, to which it adjoins via the rear side of an attachment block on an inner side of the side wall, or is attached, while an underside of the attachment block projects on the floor wall or is attached with it. On the rear side the upper holding element is provided with a flange, which adjoins on the inner side of the side wall, with the component block attaching on the flange and defining a preset interval with its front-side adjoining surface.

DE 33 00 066 A1 has as its object to so configure a switch cabinet, that the panel can be installed simply and easily with the least possible loss of space for the usable surface for the switching system. For this, the panel is designed so that it forms the rear wall of the switching housing, so that the panel, completely equipped and wired, and thus heavy, only needs to be placed on the switching cabinet as a rear wall. This procedure does have a disadvantage, though, in that it is no longer possible to seal the switching cabinet off from its surroundings so as to be free of dust and moisture.

SUMMARY

This section provides a general summary of the disclosure, and is not a comprehensive disclosure of its full scope or all of its features.

The object of the disclosure is to further develop a frame profile of the class described at the outside, so that expanded installation options result, but nonetheless the switching cabinet can be well sealed against dust and moisture from the surroundings.

According to the disclosure, with a frame profile, at least a first profile section is provided, which has a plurality of attachment openings, wherein a first surface fixes an outer assembly plane. Through at least one second profile section, a sealing plane is defined for sealing the inner area of the rack, wherein the outer assembly plane is offset by the sealing plane to the inner area of the rack. The attachment openings of the first profile section point away from the inner area of the rack. Depending on the type of profile, this means that these attachment openings in principle are only accessible from outside the rack, because for example they are attached in a profile side of a hollow profile placed with the rack, or, for example, with a flange-like profile section, they are configured as through-passage openings, which in fact are accessible from the inner and outer area, but according to the disclosure they also point away from the inner area of the rack, because the assembly options are from outside.

The disclosure makes available an assembly frame accessible from without, which if necessary even encircles, in an assembly plane that is displaced inward to a sealing plane, and thus lies within the sealing area of the switching cabinet, so that the prerequisites exist to mount at least a part of the components for the interior design more simply than previously, wherein moreover all the required types of protection can be taken into account. The mounting frame can be equipped with a system of openings in the customary way, and thus offers a plurality of attachment options from without, wherein it can even be conceivable to keep an equipped and thus very heavy panel stationary, and to move the rack on this into an assembly position.

The disclosure specific concept makes possible multiple assembly options, according to one variant, provision can be made that the attachment openings are provided on the same profile section which also defines the sealing plane. However, preferably the second profile section, which defines the sealing plane for sealing of the inner area, is different from the first profile section.

Also preferred, the first assembly plane can run parallel to the sealing plane, even if positional relations that deviate therefrom between the assembly plane and sealing plane are conceivable.

Additional assembly options are obtained by a third profile section having a plurality of attachment openings, which point to the inner area of the rack, wherein through the attachment openings a second assembly plane is defined. Thus it is further ensured that, for example, a panel can be mounted both from without and from within.

Preferably the second assembly plane runs parallel to the first assembly plane.

The sealing plane can be defined by a flat profile section or by the free end area of a double-back profile section. For special profiles, provision can be made that the sealing plane be defined by the free end area of two profile sections fitted onto each other, whereby these profile sections can have differing properties. One such profile is described in patent application DE 10 2014 101 402.2, submitted on that same application day.

One panel for use with at least one frame profile as per the present disclosure, which comprises in essence rectangular base plates, has a rounding off on at least one of its sides, which continues into a rounding off running parallel to the base plate for placement on the first assembly plane. Thus the panel can be screwed directly into the opening system of the assembly plane. For this, positioning and attachment aids can be used.

One method for assembly of components for the inner structure of a rack-based switching or distribution cabinet comprises the following steps:
a) providing a rack made of frame profiles, wherein at least one of the frame profiles is a frame profile of the present disclosure;
b) determining a sealing plane on a frame profile;
c) selecting an assembly plane of the frame profile that points away from the inner area of the rack, which is displaced from the sealing plane toward the inner area of the rack, and the attachment openings of which point away from the inner area of the rack;
d) attachment of at least one component in the selected assembly plane; and
e) closing of the sealing plane.

This method makes possible the assembly, for example of a lock, from without on a vertical frame profile, whereby the lock then lies within the sealing area. Often components are attached to two or more profiles, so that it is preferred, after step c), to repeat steps b) and c) for a further frame profile. Then one component or multiple components can be attached in the assembly plane of the first frame profile and in the assembly plane of the second frame profile. In this way, mounting rails, mounting chassis, panels, baffles or the like can be installed.

DRAWINGS

The drawings described herein are for illustrative purposes only of selected embodiments and not all possible implementations, and are not intended to limit the scope of the present disclosure.

In what follows the disclosure shall be explained in more detailed, in purely exemplary fashion, with the aid of the appended drawings. The depictions in the figures are not necessarily to scale. Shown are.

DETAILED DESCRIPTION

Example embodiments will now be described more fully with reference to the accompanying drawings.

Figure 1:
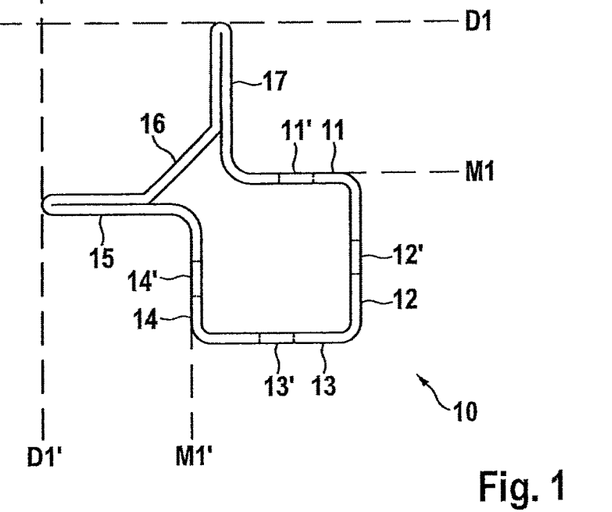
FIG. 1 a section view of a first embodiment of a frame profile as per the present disclosure FIG. 2 a top-down view of the frame profile of FIG. 1 with attached lock FIG. 3 a perspective view of a corner area of the rack with a vertical frame profile as per FIG. 1 and a part of a panel hinged thereon FIG. 4 a section view with two frame profiles as per FIG. 1

FIG. 1 shows a section view of a first embodiment of a frame profile 10 as per the present disclosure, which is used in a rack for a switching or distributor cabinet. The frame profile 10 can form a vertical and/or horizontal profile of the rack, and consists of a plurality of profile sections 11, 12, 13, 14, 15, 16, 17, which fit into each other, in order to form a closed hollow profile. Profile sections 11, 12, 13, 14 in essence enclose a hollow chamber section with a square cross section, wherein profile sections 11 and 14 fit into profile sections 17 and 15 that run perpendicular to them, which bend back on themselves and on the other side are connected with each other via profile section 16. The free end areas of profile sections 15 and 17 form the outer edges of the rack, which is assembled from frame profiles 10, and thus define a sealing plane D1 or D1', which, in the depicted embodiment, is shown so that they run perpendicular to the bent portions of the profile section 15 and 17. This perpendicular course of the particular sealing plane D1, D1' is not absolutely necessary, but for most structural situations with a rack is appropriate. The sealing spaces D1, D1' with suitable seals and planar components form an interface to the outer area of the rack, as will be explained later in connection with FIG. 7. With the arrangement indicated in FIG. 1, the profile sections 11, 12, 13, 14 surrounding the hollow chamber are each provided with attachment openings 11', 12', 13', 14'. The attachment openings 11', 12', 13', 14' can be hole systems in very varied configurations, as is known in the field. Through the surface of profile section 11 pointing to sealing plane D1, an assembly plane M1 is defined which, as long as no planar pieces or side walls are assembled, is accessible from the outer side of the rack. Thus, various components can be easily installed, which nonetheless are in the sealing area of the switching cabinet. In a similar way, the surface of profile section 14 pointing to sealing plane D1' defines an assembly plane M1', which likewise, as described above, is accessible from without and which permits mounting of components in the sealing area of the later completed switching cabinet. In the embodiment form depicted, the assembly planes M1, M1' are described as lying parallel to the sealing planes D1, D1', although other positional arrangements may be possible. The assembly of the inner area of the rack remains possible via the attachment openings 12' and 13' provided on the profile sections 12 and 13.

Figure 2:
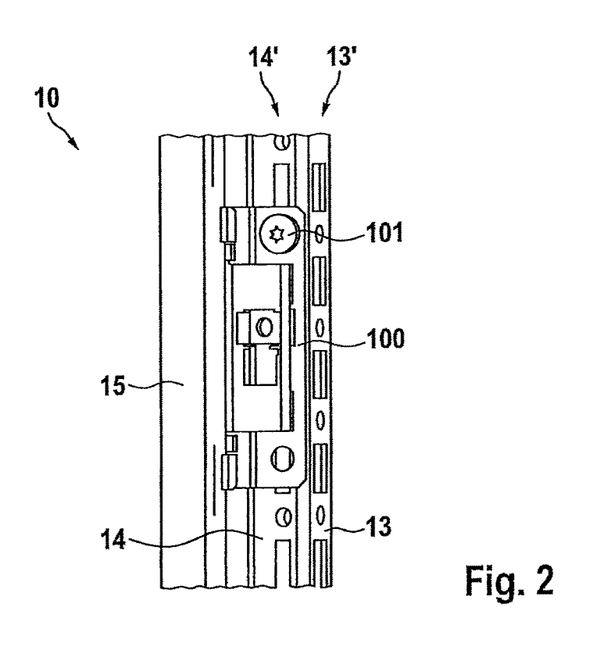

FIG. 2 shows as an example how a lock 100 is to be attached on a frame profile 10 as per FIG. 1. The lock 100 is a standard component, which can be screwed onto a frame profile, is by just a single screw 101 as depicted in FIG. 2, which already was screwed into a hole in attachment opening 14'. The lock 100 lies in the angle area between profile sections 14 and 15, and thus within the sealing area of frame profile 10. Unaffected by the assembly of lock 100, options remain to attach additional components, for example in the attachment opening 13' of profile 13.

Figure 3:
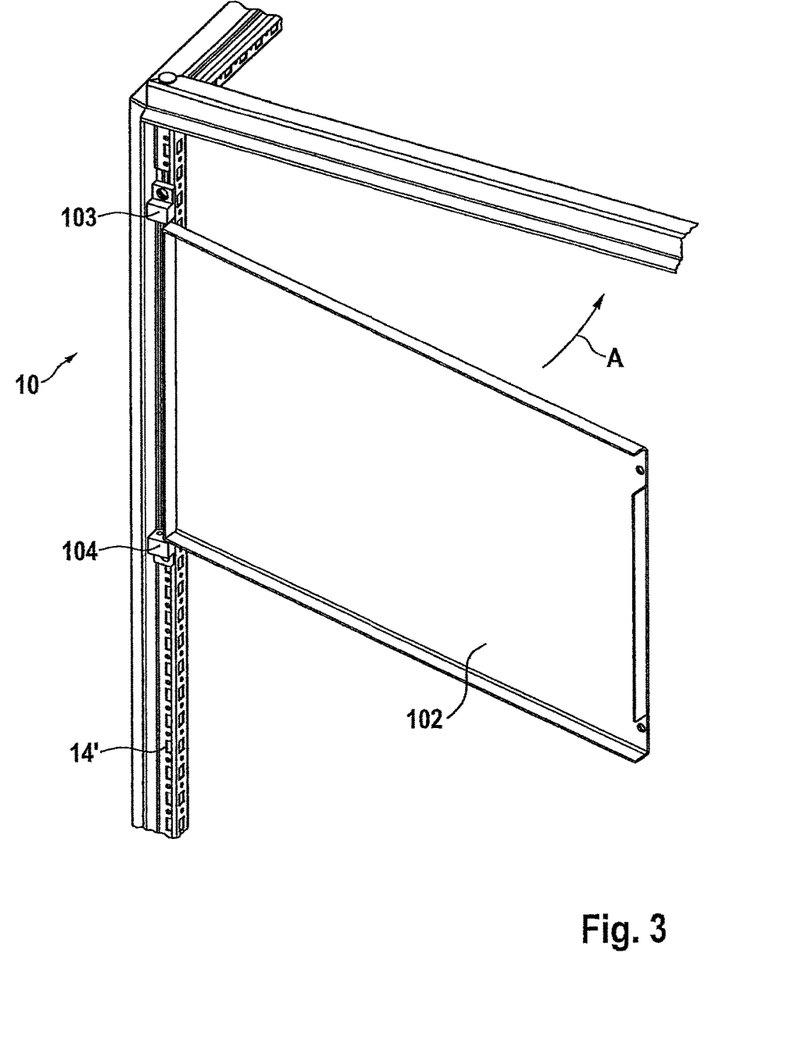

FIG. 3 shows a perspective view of a corner of a rack with a vertical frame profile 10 as per FIG. 1 and, as a further example for installation from without, the attachment of part of a panel 102 on the vertical frame profile 10. For this, two hinges 103, 104 are placed at a distance from each other in the attachment openings 14' of assembly plane M1' (FIG. 1), which hold the part of the panel 102 between them so as to pivot. If the part of the panel 102 is pivoted in the direction of arrow A, it is fully in the sealing area of the rack behind the sealing plane D1' (FIG. 1).

Figure 4:
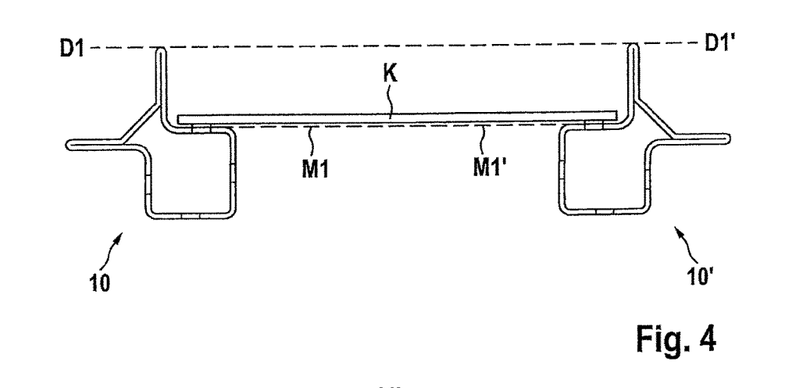

In FIG. 4, two frame profiles 10, 10' as per FIG. 1 are so arranged that their sealing planes D1, D1' are in alignment. With identical frame profiles 10, 10', thus also the mounting planes M1, M1' also coincide, so that the corresponding profile sections can be used for installation of components, as is indicated by the schematically-depicted component K.

Figure 5:
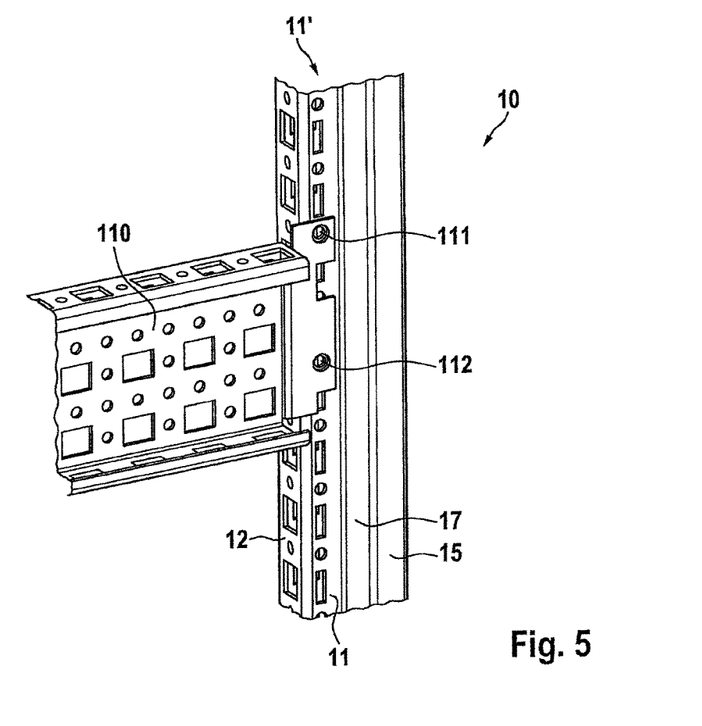
FIG. 5 a perspective view of a frame profile as per FIG. 1 with attached mounting chassis FIG. 6 a perspective view of a corner area of a rack with a vertical frame profile as per FIG. 1 and mounting chassis and mounting rails attached thereon FIG. 7 a section view from which the attachment of flat pieces for screening off the inner space of a rack to seal out dust and moisture can be seen FIG. 8 a section view of a second embodiment form of a frame profile according to the present disclosure FIG. 9 a perspective view of the frame profile as per FIG. 8

This is illustrated in greater detail in FIG. 5, with the example of a mounting chassis 110. A frame profile 10 as per FIG. 1 is so arranged as a vertical frame profile that profile sections 15, 17 point to the right in the viewing direction, so that the attachment openings 11', which define the outward-pointing mounting plane M1 (FIG. 1), are to be seen on profile section 11 from the front. Initially the mounting chassis 110 with its fixing hooks (not visible in the figure) provided in the edge areas is suspended on suitable [ . . . ] of the attachment openings 11' of profile section 11 (the same holds true for an adjoining frame profile, which, however, is not visible in the figure). The holes 111, 112 in the edge area of mounting chassis 110 are then made to cover the system holes of attachment openings 11' on profile section 11. The mounting chassis 110 can now be secured on frame profile 10, for example by screw connecting, and in fact easily from without, without the inner area of the rack needing to be occupied during the assembly. With appropriate dimensions set, mounting chassis 110 is situated fully in the sealing area of the switching cabinet, thus, as viewed from without, behind the joint sealing plane D1, D1' (FIG. 4).

Figure 6:
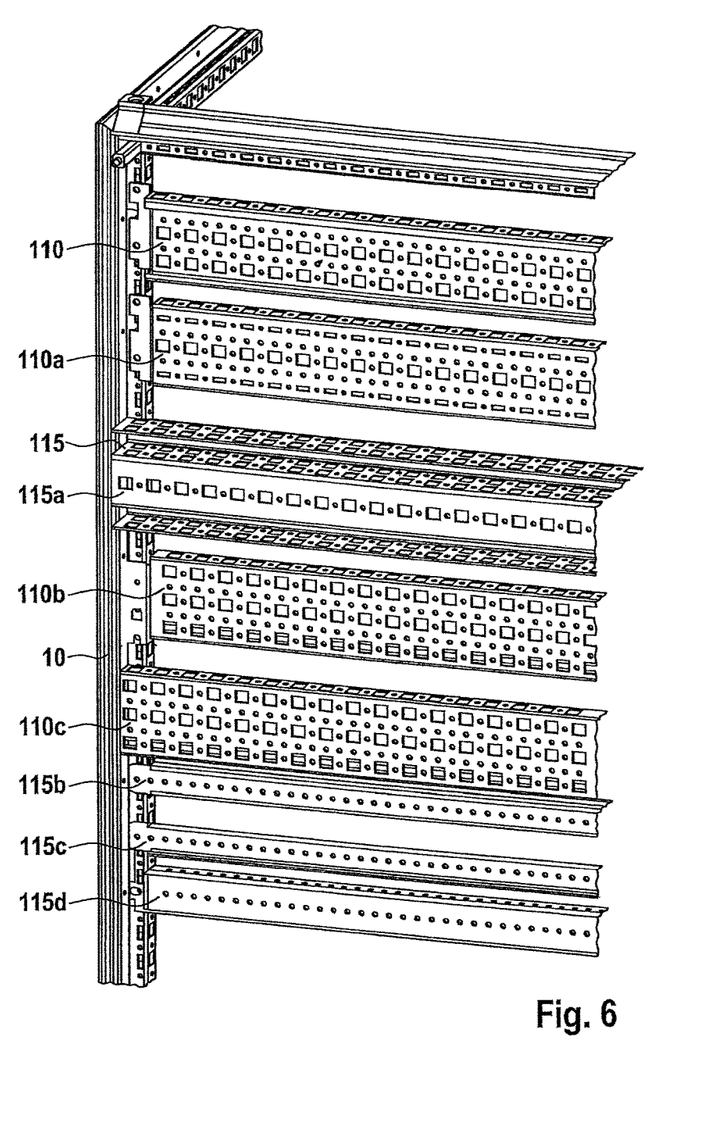

FIG. 6 is a perspective view of a corner of a rack with a vertical frame profile 10 as per FIG. 1, on which a plurality of mounting chassis 110, 110a, 110b, 110c is attached in the way described in connection with FIG. 5, just as a plurality of mounting rails 115, 115a, 115b, 115c, 115d, is secured on frame profile 10 (and on adjoining frame profiles), such that multiple mounting options, and also retrofitting and conversion processes, can be undertaken from without.

Figure 7:
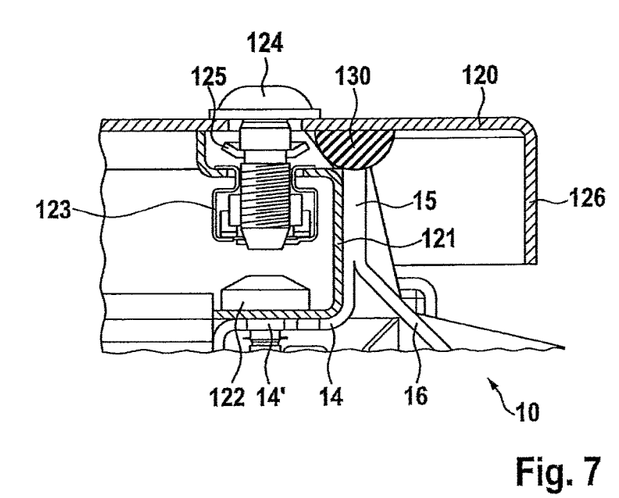

FIG. 7 shows how the sealing area of a rack is closed off with the aid of a flat piece 120, for example a side wall. On the profile section 15 of frame profile 10, which can only be seen in part in FIG. 7, a seal 130 is placed. Such a seal if necessary is provided on a corresponding profile section of an adjoining frame profile, which is not shown in FIG. 7. The flat piece 120 is now screwed together with frame profile 10, with an auxiliary shackle 121 being used, the contour of which fits snugly on the contour of profile sections 14 and 15 of frame profile 10 and than extends farther to profile section 14. The auxiliary shackle 121 is attached to attachment opening 14' of profile section 14 with the aid of a screw 122. In auxiliary shackle 121, in the section parallel to profile section 14, a spacing nut 123 is inserted, which admits an attachment screw 124 for flat piece 120. The attachment screw 124 has a number of locking catches 125, so that, once the screw 124 has been guided through an opening provided in flat piece 120, screw 124 is held so as not to be lost on flat piece 120, as soon as the locking catches 125 have traversed the opening. The flat piece 120 is now placed on the seal 130, so that the opening for screw 124 with spacing nut 13 is covered. By tightening screw 124, the flat piece 120 is securely seated on seal 130, so that dust and moisture are prevented from penetrating. Outside the sealing area, and thus in the area of profile section 16, which connects profile sections 15 and 17 (FIG. 1), flat piece 120 can have a bent section 126.

Figure 8:
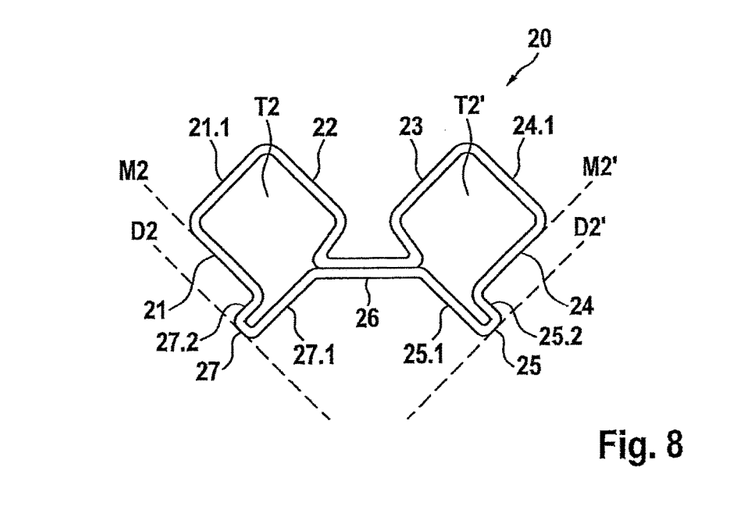

FIG. 8 is a sectional view of another embodiment of a frame profile 20 as per the present disclosure. This frame profile 20 is configured as a dual-chamber profile, with the chamber parts T2, T2' being connected with each other via a profile section 26 configured as a connecting bridge. With this, the chamber parts T2, T2', adjoining on profile section 26, form a swallowtail-shaped rear section. Profile sections 25.1 and 27.1 adjoin profile section 26 on each side at an angle of about 135°, passing over into planar profile sections 25 and 27, which in frame profile 20, each define sealing planes D2', D2. Perpendicular to the flat profile sections 25, 27, profile sections 25.2 and 27.2 adjoin, which in turn make transitions into profile sections 24 and 21 that run parallel to them, through the surfaces of which (the attachment openings are not shown) mounting planes M2', M2 are defined, which in turn are accessible from without, but which lie in the sealing area of a rack formed from such frame profiles 20. Additional attachment openings can be provided on profile sections 21.1, 22 and 23, 24.1 that surround chamber parts T2, T2'.

Figure 9:
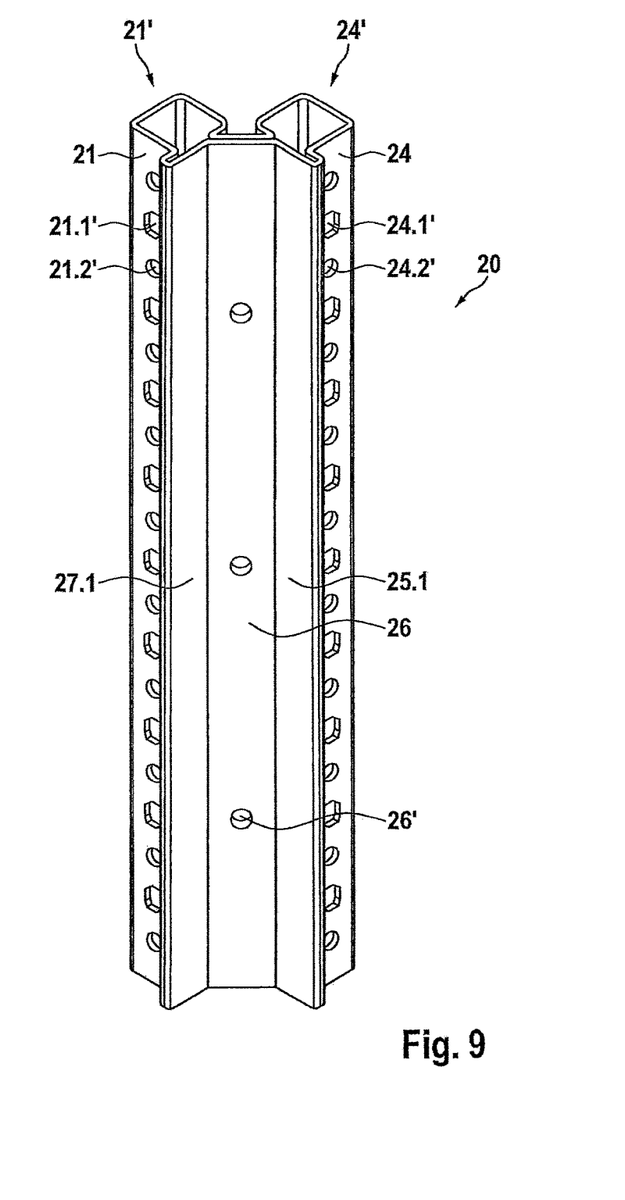

FIG. 9 is a top-down view of frame profile 20 from FIG. 8, viewing profile sections 25.1 and 27.1 with profile section 26 that joins them, which, with this embodiment, has a number of vertically spaced holes 26'. Additionally perceptible are the attachment openings 21' and 24' of profile sections 21 and 24, which in the depicted embodiment are configured as alternating holes with varying diameters 21.1', 21.2' or 24.1', 24.2'.

Figure 10:
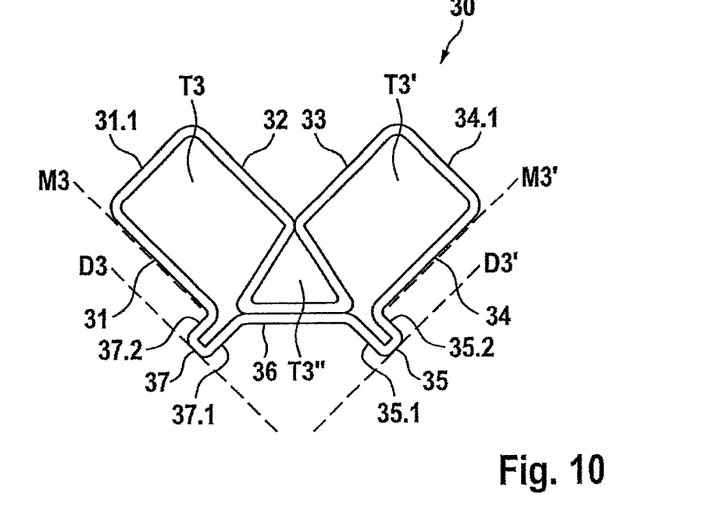
FIG. 10 a section view of a third embodiment of a frame profile as per the present disclosure FIG. 11 a section view of a fourth embodiment of a frame profile as per the present disclosure FIG. 12 a section view of a fifth embodiment of a frame profile as per the present disclosure FIG. 13 a schematic view of various assembly planes, which can be implemented with the frame profile as per FIG. 10

FIG. 9 is a sectional view of a third embodiment form of a frame profile 30 as per the present disclosure. Similar to frame profile 20 as per FIG. 8, with this hollow profile, two chamber parts T3, T3' are provided, which are opposite each other and are connected with each other by a profile section 36 configured as a connecting bridge. The chamber parts T3, T3' abut against each other with their profile sections 32 and 33, so that a third chamber part T3" is formed, which delivers improved torsional rigidity to the frame profile 30.

Adjoining profile section 36, running at an angle of about 135° to profile section 36, profile sections 35.1 and 37.1 are attached, each of which make transitions into flat profile sections 35, 37, which determine a sealing plane D3' and D3. Profile sections 35.2 and 37.2 each adjoin, running perpendicular, which in turn make transitions into profile sections 31 and 34 that are perpendicular thereto. Through the surfaces pointing to the particular sealing plane D3, D3' (once again, the attachment openings are not shown) of these profile sections 34, 31, mounting planes M3', M3 are defined, which, in the depicted embodiment form of frame profile 30, run parallel to sealing planes D3' and D3. Additional attachment openings can be provided in profile sections 31.1, 32 which limit the hollow chamber parts T3, and in profile sections 33, 34.1, which limit hollow chamber parts T3'.

Figure 11:
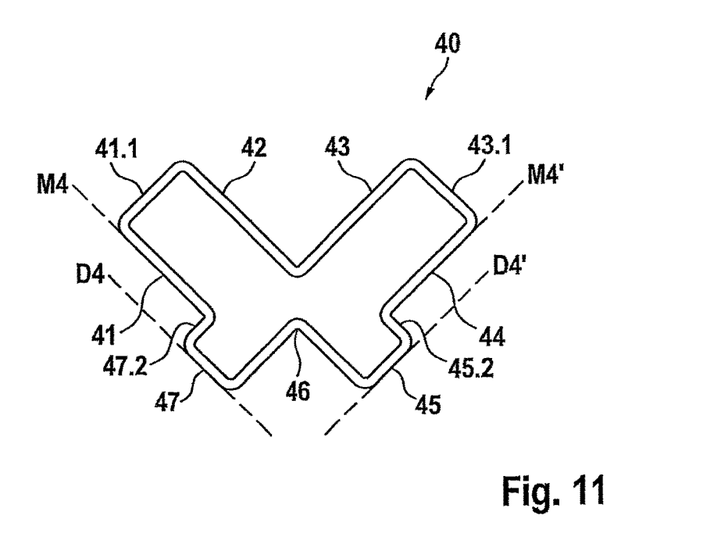

FIG. 11 shows a fourth embodiment of a frame profile 40 as per the present disclosure, which is configured as a single-chamber hollow profile. The frame profile 40 has two planar profile sections 45 and 47 connected by an angled profile section 46, which each define a sealing plane D4' and D4. At an angle of 90°, and displaced in the direction of the interior of the rack created from frame profiles 40, profile sections 44 and 41 adjoin onto profile sections 45.2 and 47.2, the surfaces of each of which define a mounting plane M4' and M4, which lie parallel to the particular sealing plane D4' and D4. As before, the attachment openings are not shown. Frame profile 40 has sections 41.1 and 43.1, each adjoining profile sections 41, 44 at a right angle, which likewise can have attachment openings (not shown), wherein the profile sections 42, 43 that adjoin thereto meet each other at a right angle.

All frame profiles 10, 20, 30, 40 previously described consist of a single material and are configured to be symmetrical to a cross sectional diagonal.

Figure 12:
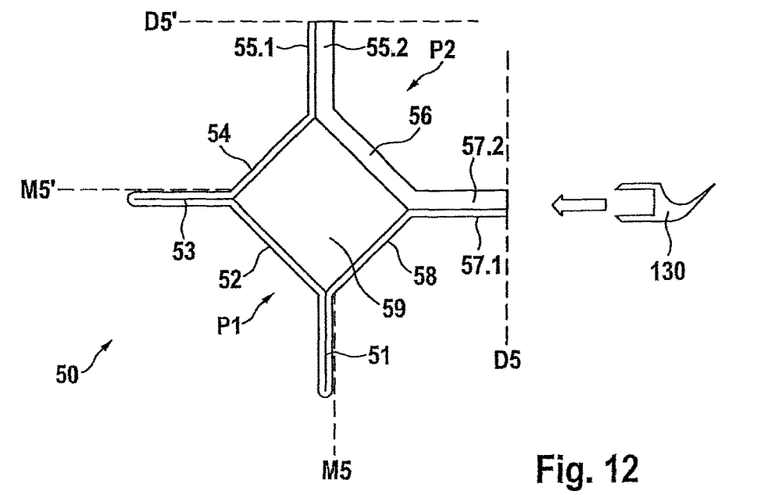

FIG. 12 is a section view of a fifth embodiment of a frame profile 50 as per the present disclosure, which is characterized in that it is assembled from two profile parts P1, P2. Profile parts P1, P2 have differing properties, for example differing mechanical properties. Thus with the depicted embodiment for profile part P1, the material has been chosen to be less thick than for profile part P2. The more thick-walled profile part P2 consists of two profile sections 55.2 and 57.2, which are arranged perpendicular to each other and connected via a profile section 56, which makes an angle of about 135° with profile section 55.2 or 57.2. Profile part P1 consists of a profile section 55.1, which adjoins profile section 55.2 of profile part P1 and on the other side is connected via profile section 54 with a profile section 53, which consists of a doubled-back sheet and thus has double the thickness of profile sections 55.1 and 54. Profile section 53 makes a transition at an angle of about 135° into a profile section 52, which then comes to an end in a profile section 51 with the same structure as that of profile section 53. Profile section 51 is connected via a profile section 58 with a profile section 57.1, which adjoins profile section 57.2. Through the free end are of profile sections 55.1 and 55.2, or 57.1, 57.2, the sealing planes D5', D5 are defined, that extend at a right angle to each other in the depicted embodiment. As a seal, for example, a detachable seal 130 can be inserted on the still free end area, for example the profile sections 57.1, 57.2. If then an additional profile is brought to adjoin onto the previously still free end of the detachable seal 130, the added-on frame profile forms a screening free of dust and moisture, so that again there is a mounting plane M5 on profile section 51 in the sealing area of the rack. A further mounting plane M5' is defined on profile section 53. Profile parts P1, P2 enclose a hollow space 59 with an essentially rectangular or square cross section, which can be used as a functioning hollow space, as is described in the patent application DE 10 2014 1010 402.2 which was applied for simultaneously.

Figure 13:
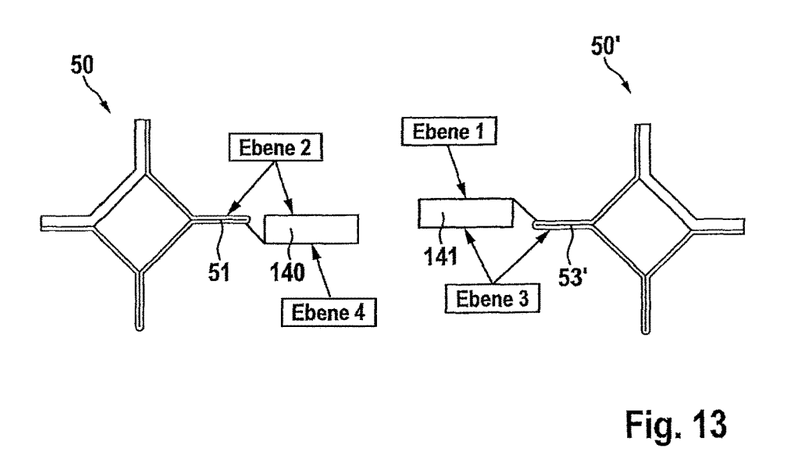

FIG. 13 shows an installation example with two frame profiles 50, 50' as per FIG. 12. On profile 51, a mounting chassis 140 is attached from the inner area of the rack, on profile section 53' of rack 50 a mounting chassis 141 from without. Thus the result, as shown in FIG. 13, is four mounting planes, namely the outer planes 1 and 2, which however still are in the sealing area of the rack, and planes 3 and 4, which are situated farther inside.

Figure 14:
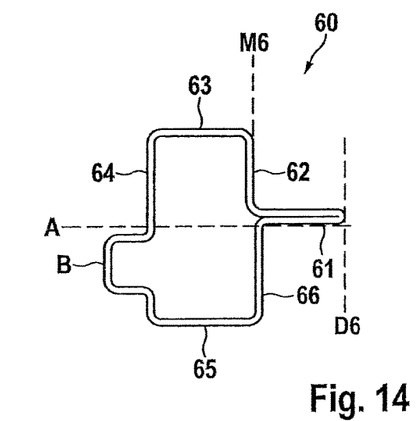
FIG. 14 a section view of an embodiment of a horizontal profile as per the present disclosure for the floor area of a rack FIG. 15 the structural position of the horizontal profile as per FIG. 14 for installation in the roof area FIG. 16 a partial depiction of a rack, which is assembled from horizontal profiles as per FIG. 14 and vertical profiles as per FIGS. 1 and 2
Figure 15:
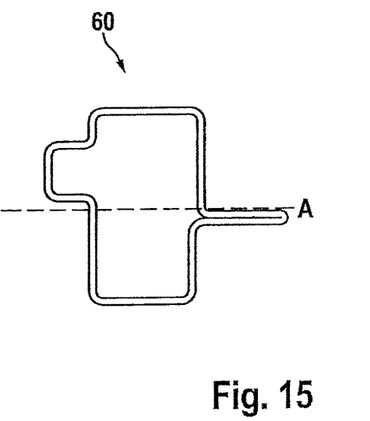

FIGS. 14 and 15 show the cross sectional view of a frame profile 60, which is installed as a horizontal profile. The profile geometries of FIGS. 14 and 15 are identical, and differ merely in the installed position, with the horizontal profile in the position of FIG. 14 installed in the floor area of a rack, while the frame profile of FIG. 15 is in the ceiling area. To use horizontal profile 60 in the other installed position, all that is needed is to turn it 180° about axis A.

As can be perceived in the horizontal profiles 60, as perceived in FIG. 14, a profile section 61 that bends back on itself is formed, the free end area of which defines a sealing plane D6. A profile section 62 that adjoins at a right angle defines a mounting plane M6, which runs parallel to sealing plane D6 and is again found in the sealing area of the rack. Perpendicular to profile section 62 there is an adjoining profile section 63, which in turn is perpendicular to a profile section 64, which has a protrusion B, the function of which is described in the patent application submitted simultaneously U.S. application Ser. No. 15/116,754 filed Aug. 4, 2016, now U.S. Pat. No. 9,871,353 issued Jan. 16, 2018. The frame profile 60 is supplemented by a profile section 65, which runs parallel to profile section 63 and on which horizontal profile 60 lies when it is used in the floor area of a rack. The profile is closed by a profile section 66 that runs perpendicular to it, which makes a transition into profile section 61. On profile sections 62, 63, 64, attachment openings are provided in the form of systems of holes, which are shown in FIG. 16.

Figure 16:
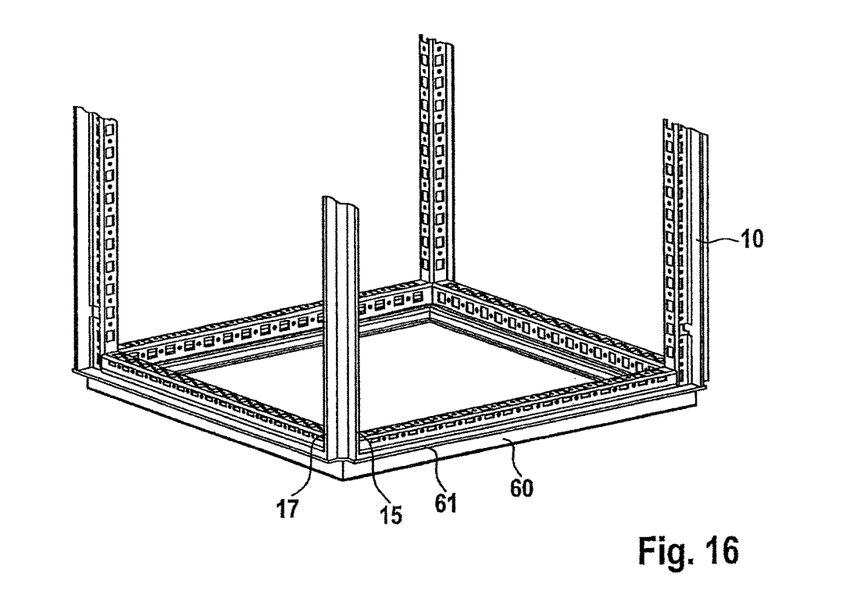

FIG. 16 is a perspective view of part of a rack, the bottom area of which is configured from horizontal profiles as per FIG. 12, while as vertical profiles, ones such as per FIG. 1 are used. It is clear that the sealing planes of the vertical frame profile 10, defined by profile sections 15, 17 and the horizontal frame profiles 60, which join two adjoining vertical frame profiles 10, defined through profile section 61, coincide, just as the mounting planes do, so that on four sides of the rack a surrounding mounting frame results, which is accessible from outside the rack. Such a mounting frame can, for example, be used to attach a panel from without on the rack. In the same way, it is conceivable that in regular instances, lighter racks can run onto the fully equipped panel, which also makes assembly considerably easier. With this, the panel can be directly screwed to the attachment openings of the mounting plane, for example with the mounting planes of horizontal profile 60 in the floor and ceiling area, only with the attachment openings of the mounting planes of the vertical frame profile 10 or both in the floor and ceiling area and the lateral areas.

Assembly aids can also be used, however, as described in connection with FIGS. 17 to 19.

Figure 17:
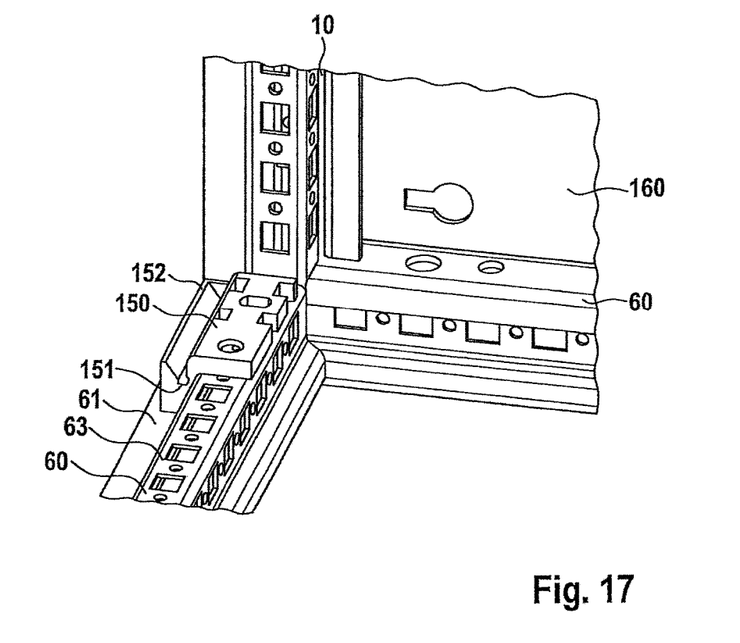
FIG. 17 a corner of a rack, with a holding piece for assisting in assembly of a panel FIG. 18 a depiction of the installation of a panel with the aid of the holding piece from FIG. 17

FIG. 17 shows a corner of a rack, which is assembled from horizontal profiles 60 and vertical frame profiles 10. Close to the vertical profile 10, a lower holding piece 150 is perceived, which is placed on profile section 63 and which lies on profile section 61. A groove 151 is configured in lower holding piece 150, which is accessible via a slanted insert piece 152.

Figure 18:
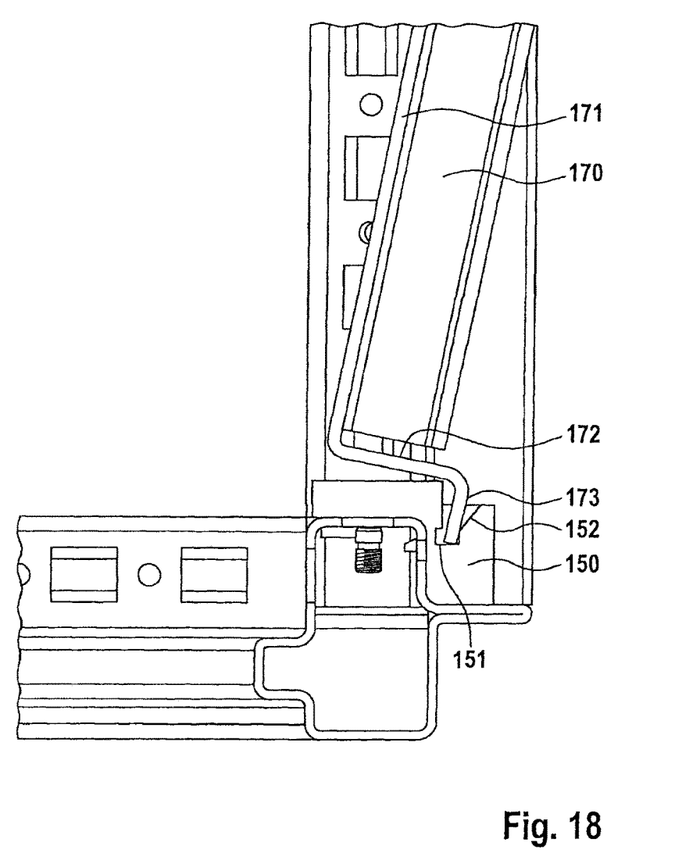

FIG. 18 shows how a panel 170 is brought into the mounting plane of the rack with the aid of lower holding piece 150. Usually a panel 170 is equipped with a covering 171 on at least two opposite sides, to increase the stability of the panel. In addition, the panel 170 as per FIG. 18 has a doubled-back foot flange section 172. A toe portion 173 diverges from the foot flange portion 172. The toe portion 173 is designed to engage into the groove 151 of lower holding piece 150. FIGS. 16 and 18 clearly show that a panel 170 placed aslant above the slanted insertion piece 152 of lower holding element 150 enables the toe portion 173 be inserted into insertion groove 151. An additional holding piece 150 is provided in the opposite corner of the rack. The panel thus can be tilted from the position shown in FIG. 18 towards the additional holding piece in the other corner of the rack to secure it.

Figure 19:
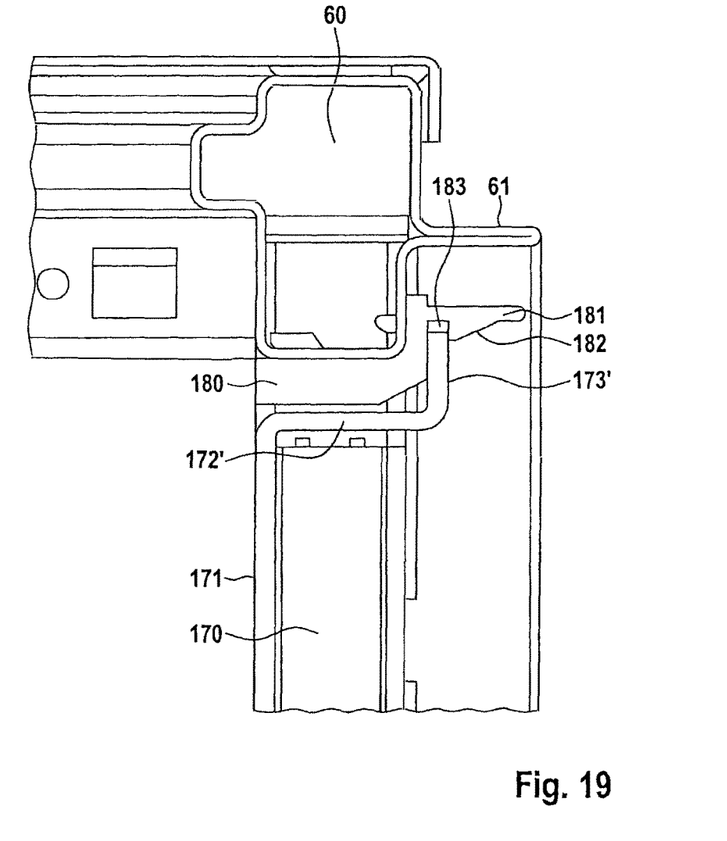
FIG. 19 the upper corner of a rack with a spring clip for pre-attachment of a panel.

This end position is depicted in FIG. 19, which illustrates a corner of a rack in its roof area, wherein, as a horizontal profile, such are used as per FIG. 14, though in the position which is shown in FIG. 15. Here the panel 170 is then equipped with a doubling back flange 172' that also has a toe 173'. On horizontal profile 60, a spring clip 180 is attached, the locking lug 181 of which lies in the vertical position in the motion path of panel 170 when set up into the vertical position. The toe 173' of the flange 172' is then run along the slanted shoulder 182 of locking lug 181, until locking lug 181 snaps over the toe 173' where it is held in a groove 183 of the locking lug 181. Through the lower holding piece 150 (or the lower holding pieces) and spring clip 180 (or the spring clips, as appropriate), panel 170 is pre-secured and now can be finally used for assembly.

Back to FIG. 17, it should be added, that there a plate 160 is pre-screwed in another mounting plane, which serves for segregation of racks or of the inner areas of them in an assembly situation.

The features of the disclosure disclosed in the present specification, in the drawings and in the claims, can be essential for implementation of the disclosure, both individually and in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A frame profile for a rack for a switching or distributor cabinet, comprising:
    first and second first profile sections;
    first and second second profile sections;
    first and second third profile sections;
    the first and second first profile sections being respectively connected to the first and second third profile sections to define a hollow chamber with a square cross section;
    the first first profile section having an attachment opening for attaching a mounting chassis thereto thereby providing a first attachment plane;
    the second first profile section having an attachment opening for attaching a second mounting chassis thereto thereby providing a second attachment plane;
    the first second profile section being connected to the first first profile section and extending perpendicularly outwardly therefrom;
    the second second profile section being connected to the second first profile section and extending perpendicularly outwardly therefrom;
    the first and second second profile sections each doubling back on themselves via a continuous bend of 180°;
    an end of the first second profile section terminating in a closed end tip for engaging a resilient member coupled to a sealing piece defining a first sealing plane, the first sealing plane being perpendicular to the first second profile section;
    an end of the second second profile section terminating in a closed end tip for engaging a resilient member coupled to a sealing piece defining a second sealing plane, the second sealing plane being perpendicular to the second second profile section; and
    the first and second sealing planes being perpendicular to each other and being displaced outwardly from the first and second attachment planes.

2. The frame profile according to claim 1, wherein the first assembly plane is parallel to the first sealing plane and the second assembly plane is parallel to the second sealing plane.

3. The frame profile according to claim 1, wherein the third profile sections have a number of attachment openings, which point to the inner area of the rack, wherein through a surface of the first third profile section a first inner assembly plane is defined; and wherein through a surface of the second third profile section a second inner assembly plane is defined.

4. The frame profile according to claim 3, wherein the first inner assembly plane is parallel to the first attachment plane and wherein the second inner assembly plane is parallel to the second attachment plane.

5. A panel in combination with at least one frame profile according to claim 1, the panel having a covering with a flange portion on an edge of the panel, and a toe portion extending substantially perpendicular to the flange portion for engaging a slot in another member of the rack.

6. A panel in combination with at least one frame profile according to claim 2, the panel having a covering with a flange portion on an edge of the panel, and a toe portion extending substantially perpendicular to the flange portion for engaging a slot in another member of the rack.

7. A panel in combination with at least one frame profile according to claim 3, the panel having a covering with a flange portion on an edge of the panel, and a toe portion extending substantially perpendicular to the flange portion for engaging a slot in another member of the rack.

8. A panel in combination with at least one frame profile according to claim 4, the panel having a covering with a flange portion on an edge of the panel, and a toe portion extending substantially perpendicular to the flange portion for engaging a slot in another member of the rack.

* * * * *